United States Patent [19]

Hepner et al.

[11] 4,022,248
[45] May 10, 1977

[54] PIPE HAVING INSULATING MATERIAL AND COVER AND HAVING TWO STRIPS OF SELF-SEALING ADHESIVE MATERIAL

[75] Inventors: Jack J. Hepner, Newark; Richard S. Hite, Toledo, both of Ohio

[73] Assignee: Owens-Corning Fiberglas Corporation, Toledo, Ohio

[22] Filed: Sept. 24, 1975

[21] Appl. No.: 616,117

[52] U.S. Cl. ............................. 138/141; 138/149; 138/151; 138/170; 156/215; 156/310; 229/48 SA; 428/40

[51] Int. Cl.² .................. F16L 9/14; F16L 9/18

[58] Field of Search .......... 138/151, 152, 153, 163, 138/164, 156, 149, DIG. 1, 141, 170; 428/40–42, 352, 201; 156/215, 310; 206/460, 813; 229/48 SA, 48 SB

[56] References Cited

UNITED STATES PATENTS

| | | | |
|---|---|---|---|
| 1,811,984 | 7/1931 | Taft | 138/149 |
| 2,992,939 | 7/1961 | Larson et al. | 138/DIG. 1 X |
| 3,092,530 | 6/1963 | Plummer | 138/151 |
| 3,135,642 | 6/1964 | Ruffer | 428/41 X |
| 3,157,204 | 11/1964 | Phillips | 138/149 X |
| 3,585,678 | 6/1971 | Neumann et al. | 425/89 X |
| 3,674,613 | 7/1972 | Lavigne | 428/40 X |
| 3,807,458 | 4/1974 | Royston | 138/149 X |
| 3,849,240 | 11/1974 | Mikulak | 138/149 X |

*Primary Examiner*—Houston S. Bell, Jr.
*Attorney, Agent, or Firm*—John W. Overman; Paul R. Rose

[57] ABSTRACT

The pipe insulation includes two semi-cylindrical pieces of insulating material secured by adhesive in a controlled pattern to an outer jacket or cover having a longitudinally extending overlapping flap. One strip of adhesive material with self-sealing adhesive on both sides is adhesively secured on one side to the inner side of the flap and another strip of adhesive material with self-sealing adhesive on both sides is adhesively secured on one side to the portion of the cover overlapped by the flap. The other side of each strip of adhesive material is provided with a protective paper covering during shipment and storage. When the pipe insulation is installed, the paper coverings are peeled off and the two strips of self-sealing adhesive material are pressed together.

23 Claims, 4 Drawing Figures

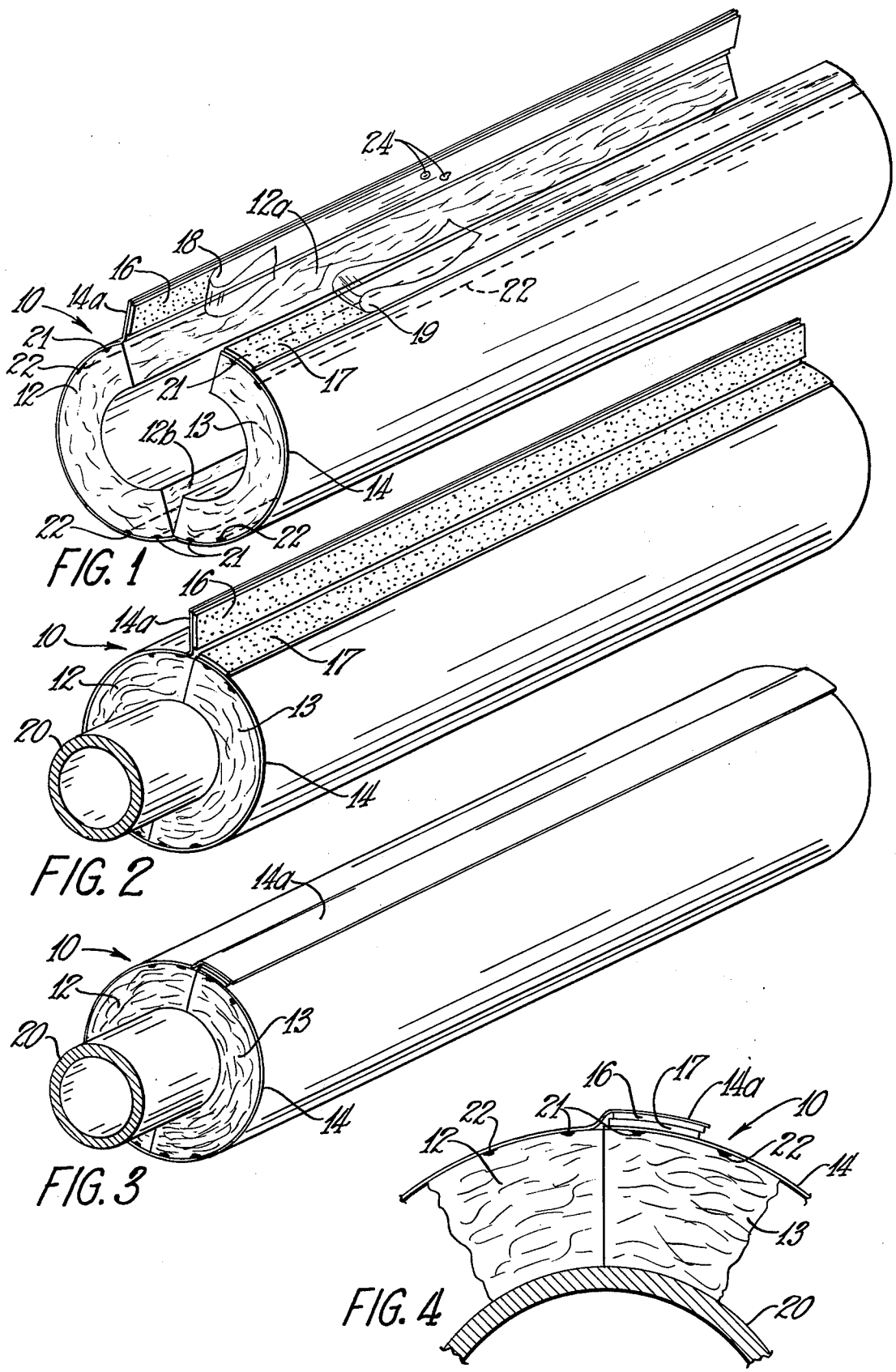

PIPE HAVING INSULATING MATERIAL AND COVER AND HAVING TWO STRIPS OF SELF-SEALING ADHESIVE MATERIAL

This invention relates generally to pipe insulation and more particularly to pipe insulation having two semi-cylindrical pieces of insulating material adhesively secured to an outer jacket or cover which acts as a hinge when the pieces of insulating material are pulled apart for installation on a pipe.

An object of the invention is to provide pipe insulation of such a type having improved means for adhesively securing the cover flap to the cover to form a seam.

Other objects and advantages will become apparent when the following specification is considered along with the accompanying drawing wherein:

FIG. 1 is a perspective view of a piece of pipe insulation constructed in accordance with the invention, two portions thereof being pulled apart for installation on a pipe and protective covering on self-sealing adhesive material being partially peeled off;

FIG. 2 is a perspective view of the piece of pipe insulation of FIG. 1 installed on a pipe, the protective covering on the self-sealing adhesive material being removed but the cover flap still being unsealed;

FIG. 3 is a perspective view similar to FIG. 2, but with the cover flap sealed; and FIG. 4 is an end view of the installed insulation of FIG. 3.

With respect to the drawing, a length of pipe insulation 10 constructed in accordance with the invention is shown. The insulation 10 includes two semi-cylindrical pieces of insulating material 12 and 13 adhesively secured at their outer peripheries to a flexible jacket or cover strip 14 having an overlapping flap 14a forming one edge portion thereof and adapted to overlap an opposite edge portion thereof. The cover strip 14 is preferably a laminate of paper, fibrous glass scrim reinforcement, and an aluminum foil vapor barrier. One strip 16 of adhesive material or tape with self-sealing adhesive on both sides is adhesively secured on one side to the inner side of the flap 14a and another strip 17 of adhesive material or tape with self-sealing adhesive on both sides is adhesively secured on one side to the outer side of the opposite edge portion of the cover strip 14. The strips 16 and 17 are respectively covered on their other sides during storage and shipment with protective silicone coated paper strips 18 and 19 (FIG. 1) removably adhered thereto.

In FIG. 1 the pieces of insulating material 12 and 13 are spread apart as they would be prior to being placed around a pipe, the cover strip 14 acting as a hinge at a point generally diagonally opposite the flap 14a, and the strips 18 and 19, called release paper, are partially peeled off the strips 16 and 17 of adhesive material. In FIG. 2, the pieces of insulating material 12 and 13 are disposed around a pipe 20 and the strips 18 and 19 of FIG. 1 have been completely removed. In FIGS. 3 and 4, the flap 14a is sealed to the opposite edge portion of the cover strip 14 by the strips 16 and 17 of adhesive material, which have been pressed together after the strips 18 and 19 of release paper have been removed. Normally the strips 18 and 19 are not removed until the insulation is on a pipe.

The pieces of insulating material 12 and 13 may be molded fibrous glass wool, plastic foam, or any other kind of insulation. The strips 16 and 17 of adhesive material or tape are about from one to two inches wide and are shown for ease of illustration with exaggerated thickness. The strips 16 and 17 are tissue paper impregnated with an adhesive, preferably an adhesive having a neoprene or acrylic base, a narrow edge portion of the tissue paper on the side with the release strips 18 and 19 being adhesive free for easy removal of the release strips.

Prior to this invention, pipe insulation was provided with only one strip of self-sealing adhesive material, such as the strip 16 on the flap 14a. A pressing tool had to be used, and in cold weather it was difficult to get the self-sealing adhesive on the flap 14a to flow into the paper at the opposite edge portion of the cover strip 14. In accordance with this invention, a second strip of self-sealing adhesive material, such as the strip 17, is provided on the opposite edge portion of the cover strip 14 from the flap 14a for cooperative engagement with the first strip of self-sealing adhesive material. A much stronger seal results from the joining of the adhesive material directly to adhesive material, and the insulation can be installed by hand pressing of the sealing strips together without the use of a pressing tool.

The cover strip 14 is secured to the pieces of insulating material 12 and 13 by adhesive extruded onto the cover strip 14 in a controlled pattern while the cover strip is flat. The pieces of insulating material 12 and 13 are rolled up in the cover strip 14 with beads of adhesive extruded thereon, as indicated in FIG. 1. Four beads 21 of a heat meltable adhesive such as amorphous polypropylene are provided on the cover strip 14 along with four beads 22 of a water based or water emulsion adhesive. The beads 21 of the heat meltable or "hot melt" adhesive are disposed on the cover strip 14 so as to be on the outer periphery of the pieces 12 and 13 and respectively adjacent the flat surfaces such as the surfaces 12a and 12b of the piece 12, defining circumferentially opposite ends of the semi-cylindrical pieces when the pieces of insulation 12 and 13 are rolled up in the cover strip. The beads 22 of water based adhesive are disposed on the cover strip 14 so as to be spaced further inwardly respectively from circumferentially opposite ends of the semi-cylindrical pieces 12 and 13 than the beads 21 of heat meltable adhesive. The hot melt adhesive 21 sets up quickly, and the water based adhesive 22 maintains the cover strip 14 properly in place when the pipe insulation encounters temperatures in shipment high enough to remelt the hot melt adhesive temporarily. Each of the beads 21 and 22 extends longitudinally of the pieces of insulation 12 and 13 for the full length of the cover strip 14, but for clarity only one bead 21 and one bead 22 are shown full length in broken lines in FIG. 1.

It is within the scope of the invention to provide three pieces of insulation, each of arcuate length of one hundred twenty degrees, secured to a cover strip 14 in a similar manner, for pipes of larger diameter.

Preferably some lightly sealing adhesive 24, shown as two drops in FIG. 1, is placed on the flap 14a on top of the release paper 18 for the strip 16 of adhesive material, to temporarily hold the flap 14a in a closed position during shipment of the insulation 10.

Various modifications may be made in the structure shown and described without departing from the spirit and scope of the invention.

We claim:

1. In a length of pipe insulation including cylindrically shaped insulating material, a flexible outer cover strip adhesively secured to the insulating material and having an overlapping flap forming one edge portion thereof, the flap being adapted to overlap an oposite edge portion of the cover strip when the insulation is installed on a pipe, and a first strip of adhesive material adhesively secured on one side to the inner side of the flap, having self - sealing adhesive on the other side thereof, and having a protective strip of covering material removably adhered to the self - sealing adhesive on said other side thereof, the improvement comprising a second strip of adhesive material adhesively secured on one side to the outer side of the opposite edge portion of the cover strip, having self - sealing adhesive on the other side thereof, and having a protective strip of covering material removably adhered to the self - sealing adhesive on said other side thereof, the second strip of adhesive material cooperatively engaging the first strip of adhesive material and firmly adhering thereto upon removal of both protective strips and the mere pressing of the strips of adhesive material together after the insulation is installed on a pipe.

2. A length of pipe insulation as claimed in claim 1 wherein the insulating material comprises two semi-cylindrical pieces.

3. A length of pipe insulation as claimed in claim 2 wherein the insulating material is fibrous glass wool.

4. A length of pipe insulation as claimed in claim 1 wherein the insulating material is fibrous glass wool.

5. A length of pipe insulation as claimed in claim 1 including additional adhesive means for temporarily holding the flap in closed position during storage and shipment of the pipe insulation.

6. A length of pipe insulation comprising tubularly shaped insulating material, a flexible outer cover strip secured to the insulating material by beads of heat meltable adhesive extending longitudinally of the insulating material, the cover strip having an overlapping flap forming one edge portion thereof, the flap being adapted to overlap an opposite edge portion of the cover strip when the insulation is installed on a pipe, a first strip of adhesive material adhesively secured on one side to the inner side of the flap, having self - sealing adhesive on the other side thereof, and having a protective strip of covering material removably adhered to the self - sealing adhesive on said other side thereof, and a second strip of adhesive material adhesively secured on one side to the outer side of the opposite edge portion of the cover strip, having self - sealing adhesive on the other side thereof, and having a protective strip of covering material removably adhered to the self - sealing adhesive on said other side thereof, the second strip of adhesive material cooperatively engaging the first strip of adhesive material and firmly adhering thereto upon removal of both protective strips and the mere pressing of the strips of adhesive material together after the insulation is installed on a pipe.

7. A length of pipe insulation as claimed in claim 6 wherein the insulating material is fibrous glass wool.

8. A length of pipe insulation as claimed in claim 6 wherein the cover strip is secured to the insulating material also by beads of water based adhesive extending longitudinally of the insulating material and being spaced from the beads of heat meltable adhesive.

9. A length of pipe insulation comprising two semi-cylindrical pieces of insulating material adapted to form a tube, and a flexible outer cover strip secured to the insulating material by four beads of heat meltable adhesive extending longitudinally of the insulating material and being disposed between the cover strip and the outer periphery of the semi-cylindrical pieces of insulating material and respectively adjacent flat radial surfaces respectively defining circumferentially opposite ends of the semi-cylindrical pieces of insulating material, the cover strip having an overlapping flap forming one edge portion thereof, the flap being adapted to overlap an opposite edge portion of the cover strip when the insulation is installed on a pipe, a first strip of adhesive material adhesively secured on one side of the inner side of the flap, having self - sealing adhesive on the other side thereof, and having a protective strip of covering material removably adhered to the self - sealing adhesive on said other side thereof, and a second strip of adhesive material adhesively secured on one side to the outer side of the opposite edge portion of the cover strip, having self - sealing adhesive on the other side thereof, and having a protective strip of covering material removably adhered to the self - sealing adhesive on said other side thereof, the second strip of adhesive material cooperatively engaging the first strip of adhesive material and firmly adhering thereto upon removal of both protective strips and the mere pressing of the strips of adhesive material together after the insulation is installed on a pipe.

10. A length of pipe insulation as claimed in claim 9 wherein the pieces of insulating material are fibrous glass wool.

11. A length of pipe insulation as claimed in claim 9 wherein the cover strip is secured to the pieces of insulating material also by beads of water based adhesive extending longitudinally of the pieces of insulating material and being spaced from the beads of heat meltable adhesive.

12. A length of pipe insulation comprising two semi - cylindrical pieces of insulating material adapted to form a tube, and a flexible outer cover strip secured to the insulating material by four beads of heat meltable adhesive extending longitudinally of the insulating material and being disposed between the cover strip and the outer periphery of the semi - cylindrical pieces of insulating material and respectively adjacent flat radial surfaces respectively defining circumferentially opposite ends of the semi - cylindrical pieces of insulating material, and also by beads of water based adhesive extending longitudinally of the pieces of insulating material and being disposed between the cover strip and the outer periphery of the semi - cylindrical pieces of insulating material in spaced relationship from the beads of heat meltable adhesive, the cover strip having an overlapping flap forming one edge portion thereof, the flap being adapted to overlap an opposite edge portion of the cover strip when the insulation is installed on a pipe.

13. A length of pipe insulation as claimed in claim 12 including a strip of adhesive material adhesively secured on one side to the inner side of the flap, having self - sealing adhesive on the other side thereof, and having a protective strip of covering material removably adhered to the self - sealing adhesive on said other side thereof.

14. A length of pipe insulation as claimed in claim 13 wherein the pieces of insulating material are fibrous glass wool.

15. A length of pipe insulation as claimed in claim 13 including additional adhesive means for temporarily holding the flap with the strips of adhesive material and release paper thereon in closed position during storage and shipment of the pipe insulation.

16. A length of pipe insulation as claimed in claim 12 wherein the pieces of insulating material are fibrous glass wool.

17. A length of pipe insulation comprising tubularly shaped insulating material and a flexible outer cover strip adhesively secured to the insulating material, the cover strip having overlapping opposite edge portions, one edge portion having self - sealing adhesive on an inner side thereof and the other edge portion having self - sealing adhesive on an outer side thereof, and the self - sealing adhesive on both edge portions being protected by covering material removably adhered thereto, whereby when the length of pipe insulation is installed on a pipe, the covering material on the self - sealing adhesive may be removed and the overlapping opposite edge portions of the cover strip may be merely pressed together to form a firm seal therebetween.

18. A length of pipe insulation comprising tubularly shaped insulating material and a flexible outer cover strip secured to the insulating material by spaced separate beads of heat meltable adhesive and water based adhesive extending longitudinally of the insulating material, the cover strip having an overlapping flap forming one edge portion thereof, the flap being adapted to overlap an opposite edge portion of the cover strip when the insulation is installed on a pipe.

19. A length of pipe insulation as claimed in claim 17 wherein the insulating material is fibrous glass wool.

20. A length of pipe insulation as claimed in claim 17 wherein the insulating material comprises two semi - cylindrical pieces.

21. A length of pipe insulation as claimed in claim 18 wherein the insulating material is fibrous glass wool.

22. A length of pipe insulation as claimed in claim 18 wherein the insulating material comprises two semi - cylindrical pieces.

23. A length of pipe insulation as claimed in claim 18 wherein the flap has self - sealing adhesive with protective covering material on an inner side thereof.

* * * * *